Figure 1:
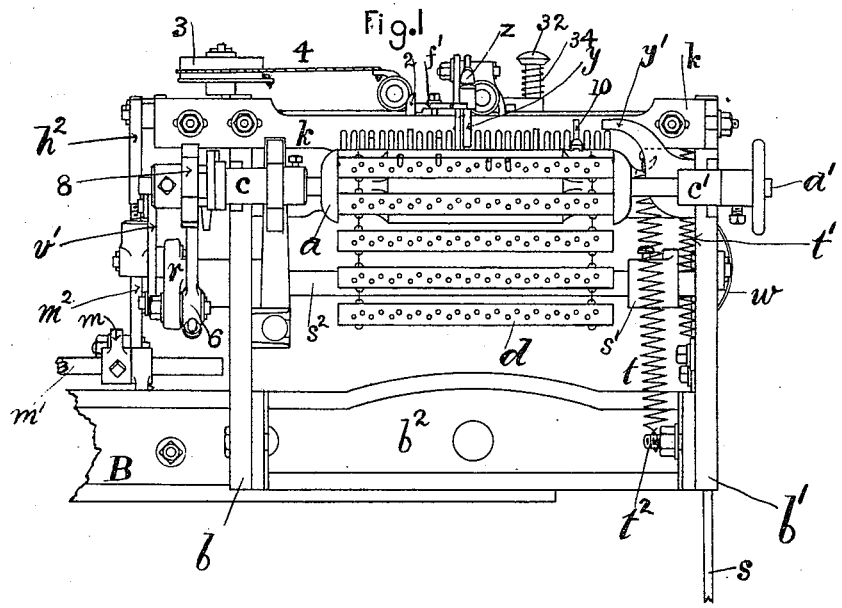
Figure 2:
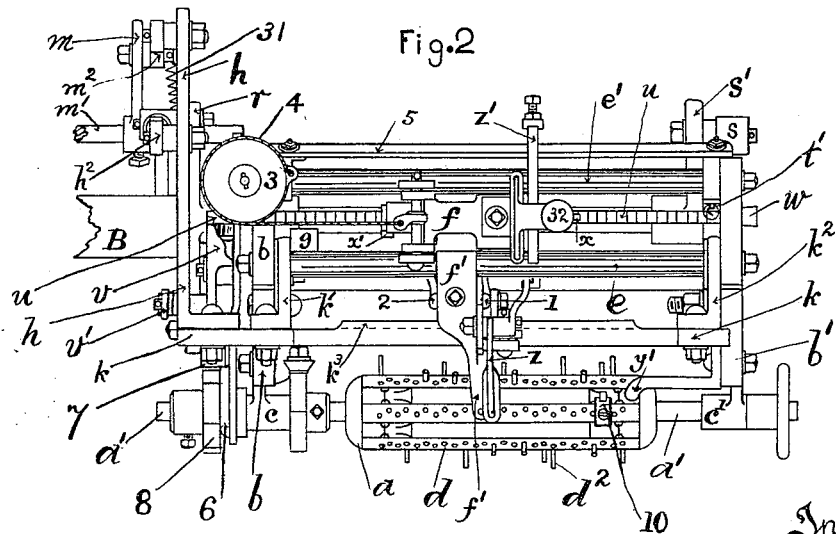

(No Model.) 7 Sheets—Sheet 1.

J. HILL & E. SMITH.
PATTERN MECHANISM FOR LOOMS.

No. 526,036. Patented Sept. 18, 1894.

Witnesses
T. Ernest
Thos. E. Robertson

Inventors
James Hill
Eber Smith
Per T.H. Robertson
Attorney

THE NORRIS PETERS CO., PHOTO-LITHO., WASHINGTON, D. C.

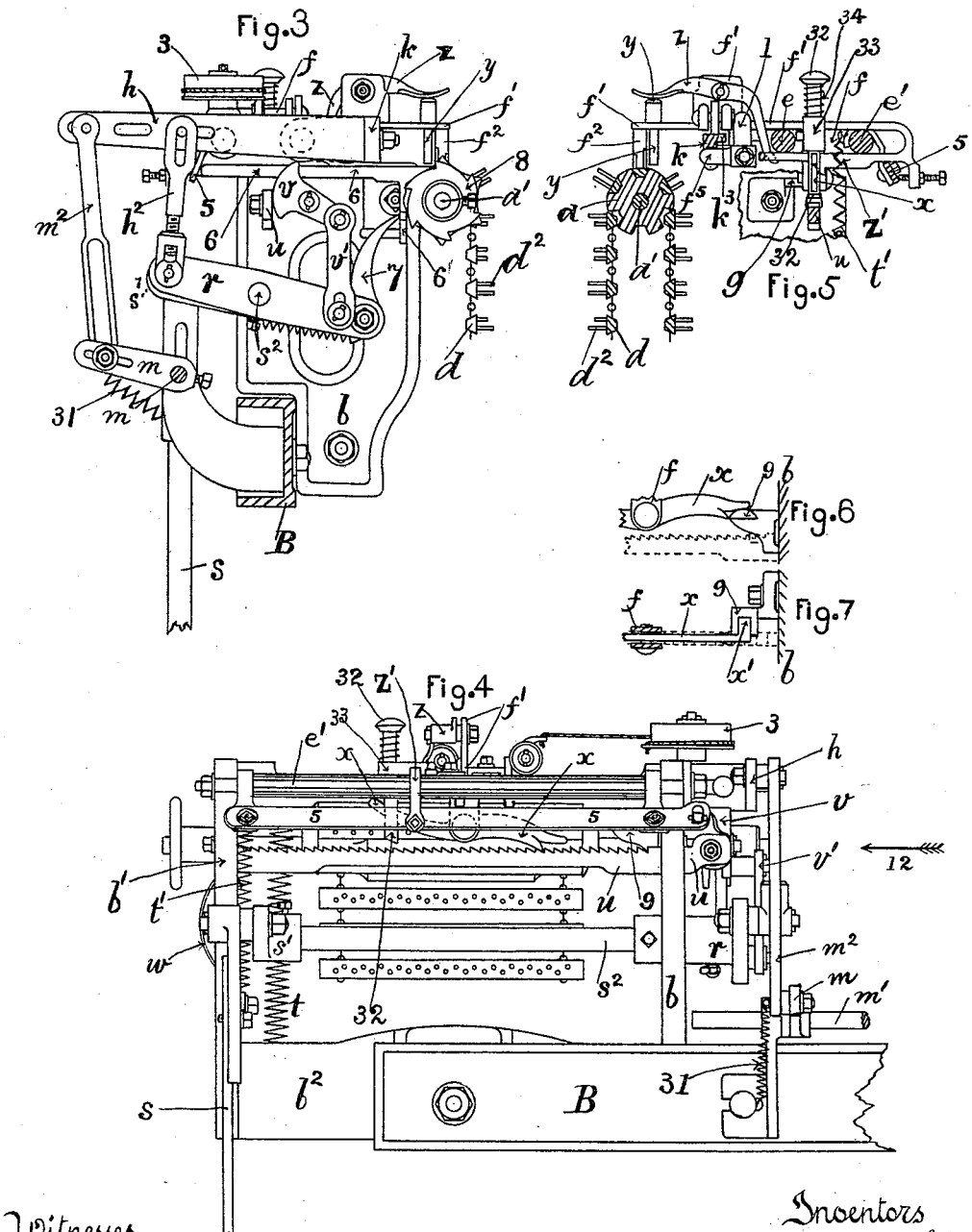

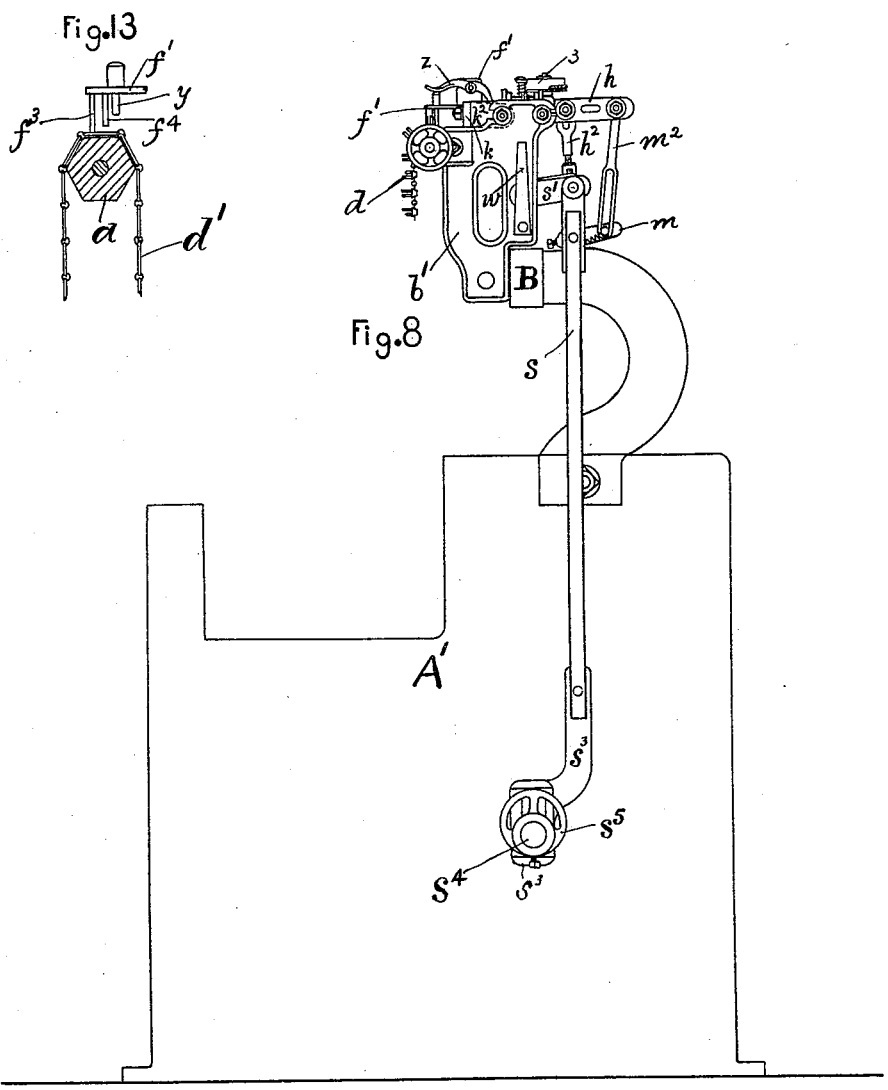

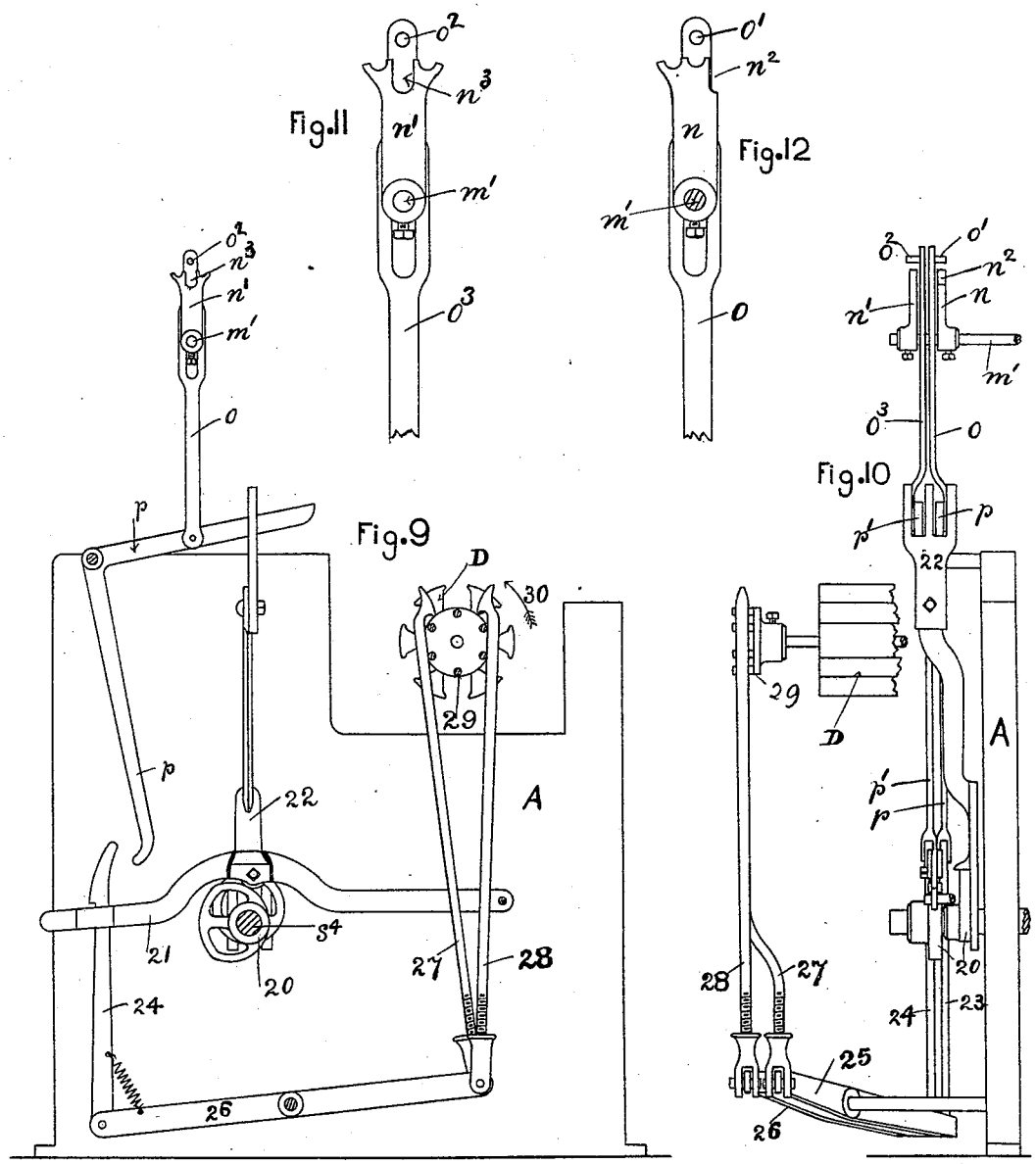

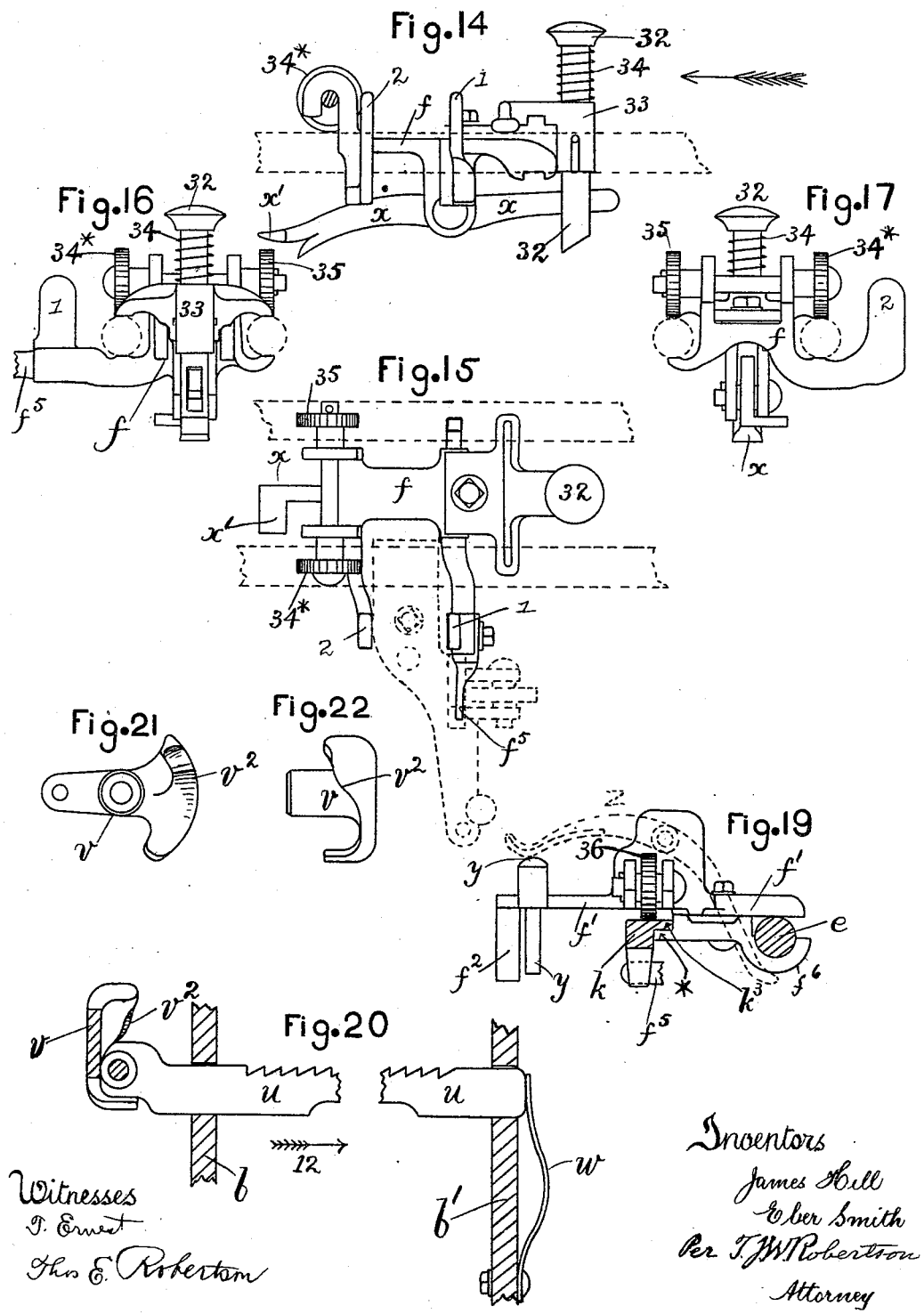

(No Model.) 7 Sheets—Sheet 6.

J. HILL & E. SMITH.
PATTERN MECHANISM FOR LOOMS.

No. 526,036. Patented Sept. 18, 1894.

Witnesses
J. Ernest
Thos. E. Robertson

Inventors
James Hill
Eber Smith
Per T. W. Robertson
Attorney (No Model.) 7 Sheets—Sheet 7.
J. HILL & E. SMITH.
PATTERN MECHANISM FOR LOOMS.
No. 526,036. Patented Sept. 18, 1894.
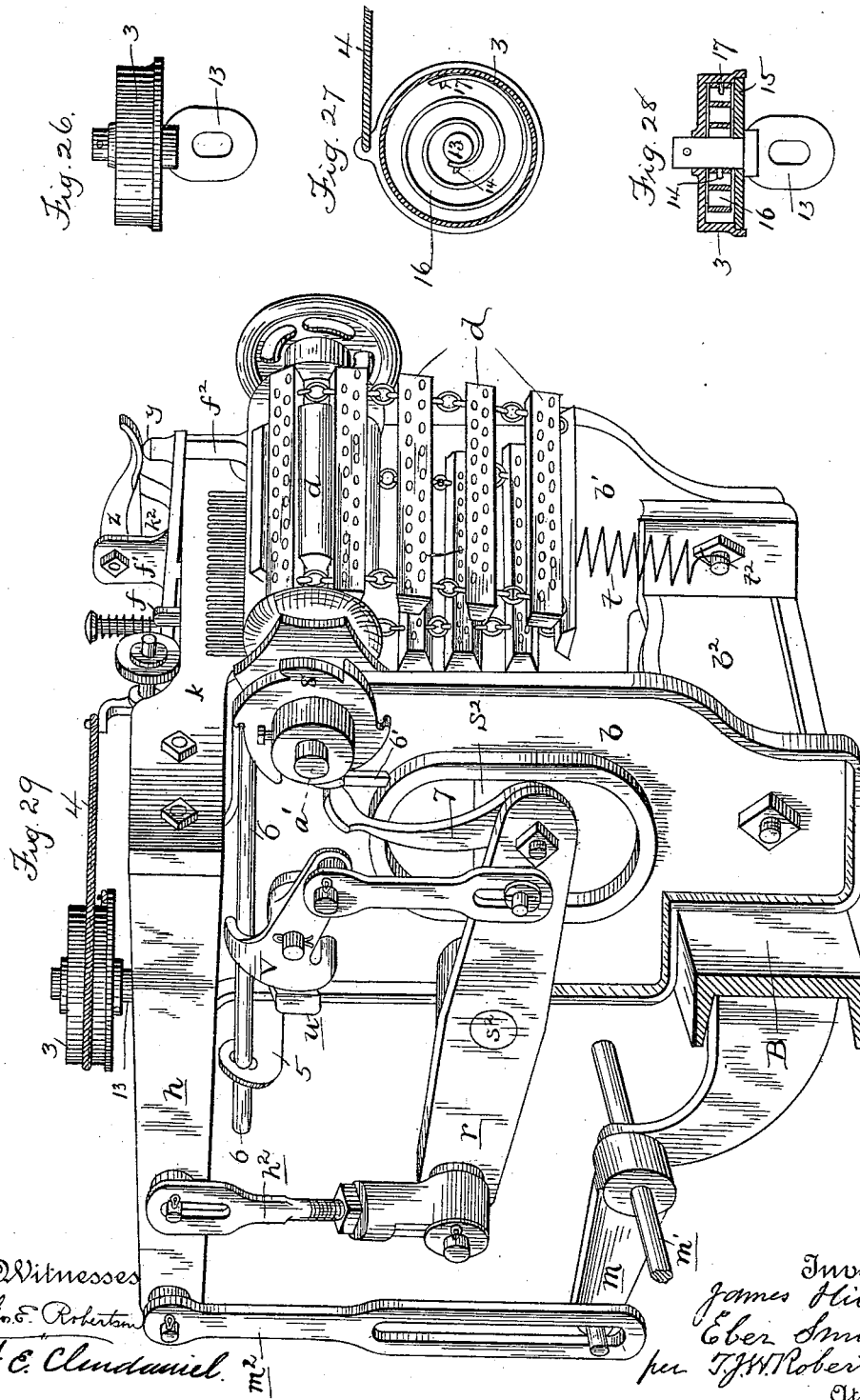

UNITED STATES PATENT OFFICE.

JAMES HILL, OF KEIGHLEY, AND EBER SMITH, OF NELSON-IN-MARSDEN, ENGLAND.

PATTERN MECHANISM FOR LOOMS.

SPECIFICATION forming part of Letters Patent No. 526,036, dated September 18, 1894.

Application filed November 10, 1892. Serial No. 451,531. (No model.) Patented in England December 8, 1891, No. 21,424.

*To all whom it may concern:*

Be it known that we, JAMES HILL, residing at Keighley, in the county of York, and EBER SMITH, residing at Nelson-in-Marsden, in the county of Lancaster, England, subjects of the Queen of Great Britain, have invented certain new and useful Improvements in Pattern Mechanism for Looms, (for which we have obtained a patent in Great Britain, No. 21,424, bearing date December 8, 1891,) of which the following description, with the appended drawings, is a specification.

Our invention relates to pattern mechanism to be employed for governing or controlling the movements of the rotary or revolving shuttle-boxes of looms, and the objects of our improvement are to produce pattern mechanism that may be readily applied to existing looms and in such a manner as to be easy of access for the weaver, that will enable the use of a pattern surface which will control, govern or regulate the movements of the shuttle-boxes through a long series of changes, and that will admit the use of a pattern surface which may be readily changed from one design to another while at all times said pattern surface is simple and easy to understand. We attain these objects by the mechanism illustrated in the drawings hereunto appended.

Figures 18, 23:
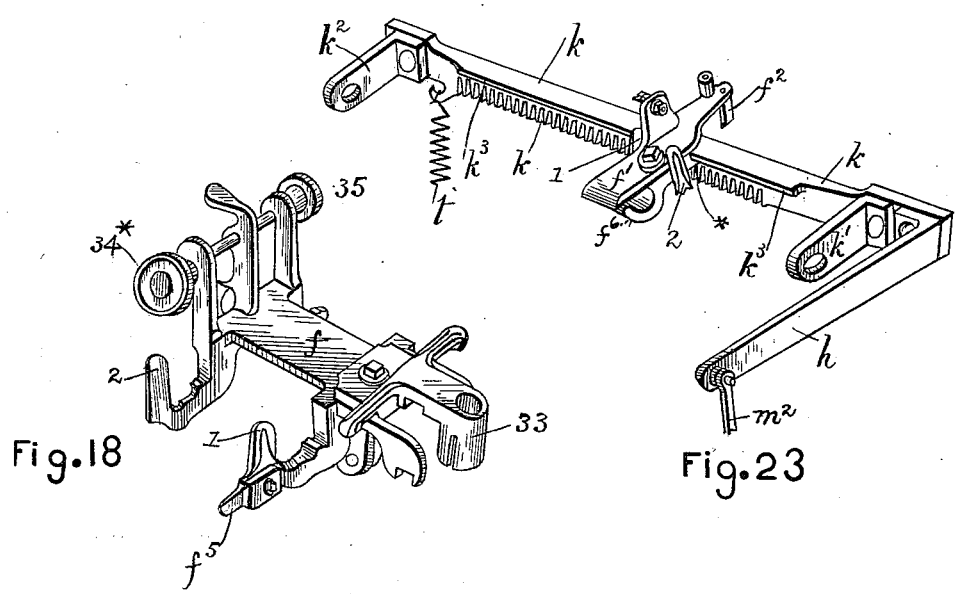
Figure 24:
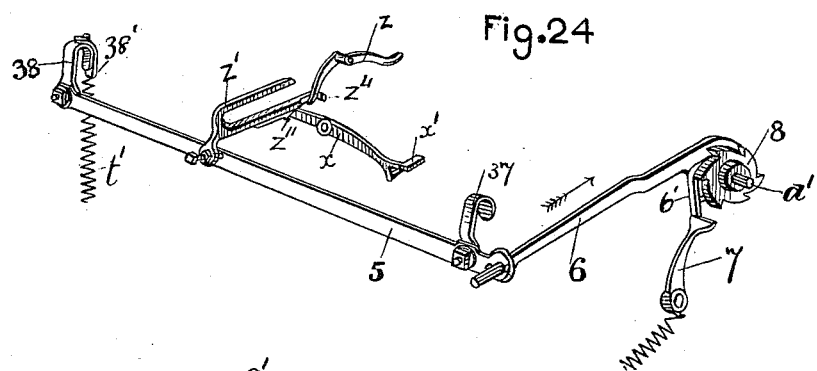
Figure 25:
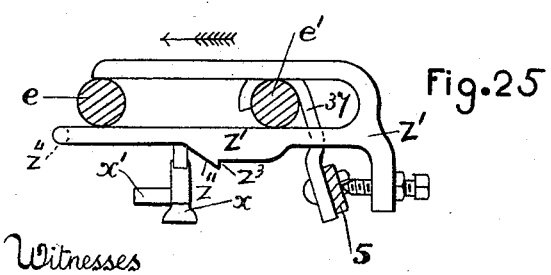

Figures 1, 2, 3 and 4 are respectively the front, top, end and back views of said mechanism embodying our invention. Fig. 5 is a transverse section of a portion of the machine with most of the framework omitted so that the other parts might be more clearly seen. Figs. 6 and 7 are side elevation and top view in detail of certain of the parts hereinafter described. Fig. 8 is an end view (reduced scale) of the mechanism as applied to a loom and as seen in the opposite direction to that in which it appears as illustrated by Fig. 3, the outline of the end-frame of the loom and one of its motor shafts together with that of the upper portions of its framework only being shown as these are sufficient to illustrate the application of our said mechanism. Figs. 9 and 10 are end and front elevations (same scale as Fig. 8) of the opposite end of the loom to that shown by Fig. 8. These views are illustrative of a sufficient portion of one of the well known arrangements of box operating mechanism to show the method of utilizing our improvement in connection therewith. Figs. 11 and 12 are drawings in detail (same scale as Figs. 1 to 7 inclusive) of certain of the parts shown by Figs. 9 and 10. Fig. 13 is a drawing, in detail, showing that by slight modification pattern cards instead of lags and pegs (as shown and described in connection with all the other drawings) might be employed as the pattern surface used with our improved mechanism. Figs. 14 and 15 are side and top views, enlarged scale, of a part hereinafter styled a "sliding bracket," its position in the machine being shown by the other drawings. Figs. 16 and 17 are end views (the former as seen in the direction of the arrow and the latter as seen in the opposite direction) of the parts shown by Figs. 14 and 15. Fig. 18 is a perspective view of the part shown by Figs. 14 to 17 inclusive, and as seen from the front of the machine. Fig. 19 is a similar view to Fig. 5 but shows certain of the parts (on an enlarged scale) that cannot be clearly seen in said Fig. 5. Fig. 20 is a vertical section (enlarged scale) of the end frames of the machine as seen from the front and is illustrative of the method followed in the mounting of certain parts therein as is hereinafter described. Figs. 21 and 22 are drawings in detail, enlarged scale, of a tumbler or cam piece employed to operate certain of the parts hereinafter described. Fig. 23 is a perspective view of detached parts as seen, when in position, from the back of the machine. Fig. 24 is a like view of other detached parts in order to clearly show their method of operation. Fig. 25 is a similar view to Fig. 5 but shows in detail, enlarged scale, parts that are partly hid in said Fig. 5. Figs. 26, 27 and 28 are detail views showing the construction of a spring-box and spring. Fig. 29 is a perspective view on a larger scale of the pattern mechanism illustrated by Figs. 1, 2, 3 and 4.

Similar letters and figures of reference indicate similar parts throughout the several views.

A A' indicate the end frames of the loom and B the upper part or top rail of said loom, on which rail B, we fix the side frames *b* and $b'$ and rail $b^2$ which form the framework for carrying the motor parts of our improved mechanism. On the side frames $b\ b'$ we fix the bearings $c\ c'$ in which the axial shaft $a'$ of the pattern cylinder $a$ revolves. The length of the pattern cylinder $a$ is such as to enable or allow the use thereon of peg-lags $d$ (or of pattern cards $d'$ as is hereinafter described) having a considerably greater number of holes for the reception of the pattern surface pegs $d^2$ than have heretofore been used in connection with pattern surface mechanism for controlling the movements of rotary shuttle-boxes, the holes in each of these lags $d$ being twenty, thirty or more in number.

On the bars $e\ e'$ carried by the side frames $b\ b'$, we mount a sliding bracket $f$ between the arms 1 and 2 of which we also hinge upon the bar $e$ the projecting piece $f'$ by securing to the under side of said piece $f'$ the clip $f^6$ so that as said bracket $f$ is moved along said bars $e\ e'$ so also will this piece $f'$ be moved thereon by reason of being between the arms 1 and 2 of said bracket $f$. The projecting piece $f'$ is made to extend over or into connection with the cylinder $a$ in order that the pin $f^2$ carried by it may be brought into contact with the pattern surface on the said cylinder $a$ as the grid-rail $k$ (upon and with which the piece $f'$ slides and moves, see Fig. 23) descends.

The part $f'$ is caused to move with the grid-rail $k$ in its oscillations about the axis of the bar $e$, by reason of its main body part extending over it while a projecting lip formed upon the clip $f^6$ attached to the under side of said part $f'$ (see Fig. 19) extends beneath the flange part $k^3$ formed on said grid-rail $k$. (See Figs. 19 and 23.) This method of arranging these parts $f'$ and $k^3$ secures unison so far as regards their vertical movements and yet allows the part $f'$ to be freely moved in a lateral direction.

The grid rail $k$ is hinged by its arms $k'\ k^2$ to the bar $e$ about which it oscillates, its upward movement being derived from the loom's motor shaft $s^4$ through the eccentric $s^5$ mounted thereon, clamp $s^3$ and rod $s$ operated by said eccentric $s^5$, lever $s'$ to which said rod $s$ is coupled, shaft $s^2$ upon which the lever $s'$ is fixed, lever $r$ also fixed to said shaft $s^2$, slotted connecting rod $h^2$ hinged to the lever $r$ and to the lever $h$ which is attached to the said grid rail $k$, the slot in the rod $h^2$ taking over a pin fixed in the lever $h$. The return or downward movement of said grid-rail $k$ is effected by the retracting spring $t$ being attached to it and to the fixed bolt $t^2$.

The lateral movement of the bracket $f$ and the part $f'$ is effected step by step from the side $b$ to the side $b'$ by means of the rack $u$, which is mounted loosely or to slide in slots in said side frames $b\ b'$ (see Fig. 20) and which is moved or slid in the direction of the arrow 12 through a space equal to the distance that one of its teeth is from another, by means of the tumbler $v$ which has a cam surface $v^2$ (see Figs. 20, 21 and 22) to effect such movement when it is operated by the lever $r$ through the rod $v'$, its return movement being effected by the spring $w$ attached to the side $b'$, each of said forward movements of said rack $u$ causing the bracket $f$ and piece $f'$ through the medium of the ratchet $x$ pivotally attached to the bracket $f$ to advance one step, in which position they are successively held by the grid of the grid-rail $k$ laying hold of the projecting piece $f^5$ attached to the bracket $f$ (see Figs. 5, 15, 18 and 19), while when said bracket $f$ has reached the side $b'$, by the pin $y$ (carried by the part $f'$) being brought into contact with the fixed piece $y'$ as the part $f'$ descends a lever $z$ (which is pivoted to said part $f'$ and has one arm bearing against a projection $z^4$ on the cam slide $z'$ and another arm arranged to come in contact with the top of the pin $y$) is caused to move by coming in contact with said pin $y$, and as it moves it causes the cam slide $z'$ to move in the direction indicated by the arrow in Fig. 25, and thus raises the ratchet $x$ out of gear with rack $u$, as the tail piece of said ratchet $x$ is arranged in a position to be operated by the cam $z''$ on the under side of said cam slide $z'$ as the latter moves, so that on the grid $k$ again rising clear of the finger $f^5$ the coiled spring 16 within the rotary box 3 will by the cord 4, retract the bracket $f$ and cause it to return to the side $b$ to recommence its feeling operations on that side of the pattern surface.

The turning-box and its immediate connections may be described as follows:—13 is a stud fixed to the side frame $b$, and carrying a plate 15, forming a bottom for the spring-box 3 fitted onto said stud 13 in such a manner that it can move loosely round the same, and having the cord 4 attached to a rim on its periphery. Inside said spring-box 3 is placed the coiled spring 16 having holes near each end. One of these holes receives the hook 14 fixed to the stud 13 while the other hole receives a hook 17 fixed to the spring-box 3. When the spring-box 3 is moved round the fixed stud 13 by the unwinding of the cord 4, the coiled spring 16 is wound more tightly around the fixed stud 13 so that when said spring-box 3 is released, the coiled spring 16 draws said spring-box 3 back to its original position, and thus again winds the cord and retracts the bracket $f$. To reduce friction and so enable the bracket $f$ and its part $f'$ to slide or move more freely on the bars $e\ e'$ and grid-rail $k$, the said bracket $f$ and part $f'$ are mounted on antifriction bowls or pulleys 34*, 35, and 36.

At the time that the cam slide $z'$ draws the ratchet $x$ out of gear with the rack $u$ as above described, it also operates the lever bar 5 (which is hinged on the bar $e'$ by the hinging pieces 37, 38. (See Figs. 24 and 25.)

Connected to the bar 5 is one end of a holding-piece 6 having its opposite end sliding upon the shaft $a'$ and carrying a tail 6' which when the holding-piece is in one position prevents the ratchet 7 from operating on the ratchet-wheel 8 mounted on the shaft $a'$ of cylinder $a$, and when in another position will allow said ratchet to act on said wheel. As the lever-bar 5 is moved as above described, the holding piece 6 is drawn sufficiently forward or in the direction indicated by the arrow in Fig. 24, to allow said ratchet 7 to engage with said wheel 8 whereby said wheel 8 is rotated (at the next movement of the lever $r$ on which said ratchet 7 is mounted) the space of one tooth so that the next lag in the pattern chain is brought to the top position on said cylinder $a$, and a tail piece $x'$ formed upon the ratchet $x$ passes over and is raised by a knock-off piece 9 (attached to the side $b$—see Figs. 6 and 7) which depresses the tail piece of the said ratchet $x$ sufficiently to clear the shoulder $z^3$ on the cam slide $z'$, thus being again liberated when the bracket $f$ has reached the side $b$ to which said piece 9 is attached. So also are re-adjusted the whole of the other parts by the spring $t'$ effecting the return movement of the lever bar 5, cam slide $z'$, lever $z$, holding piece 6 and ratchet 7, said spring having one end attached to a lip 38' (see Fig. 24) attached to the hinge piece 38, and the other end to the lower part of the side $b'$, tends to pull said lip downward and thus moves the bar 5 and its connections backward. In this manner the ratchet 7 is held out of gear with its wheel 8 to allow the cylinder $a$ to remain stationary until each hole in the lag in indicating position has been visited by the part $f'$ or utilized as hereinbefore described. When a reversal of the bracket $f$ has to be effected at any part of its path of motion other than that at the end of such movement as described, a projecting piece 10 is fixed to the lags $d$ to effect such reversal by operating the pin $y$ in the same manner as it is operated by the piece $y'$.

The movements of the rotary shuttle-boxes D are governed or controlled by the pattern surface, through the medium of the mechanism hereinbefore described, as follows:—The pattern pegs inserted in the lags $d$ are of two sizes, one extending only half the distance out of the lag $d$ as compared with the distance which the other extends, and should a long peg be in position to arrest the part $f'$ in its descent at any part of its path of motion over the cylinder $a$, by its pin $f^2$ falling thereon, then the lever $h$ will be arrested. So also will the slotted rod $m^2$ connected to said lever $h$ be arrested and that in its upward motion, this being allowed by the slot in the rod $h^2$ notwithstanding the invariable movement of the lever $r$. This arresting of the motion of the rod $m^2$ effects the adjustment of the notched pieces $n$ and $n'$ (by these being attached to the rod $m'$ to which is fixed the lever $m$ operated by the rod $m^2$) for the notch $n^2$ of piece $n$ to allow the pin $o'$ on the rod $o$ to descend therein and consequently permit the bell crank lever $p$ (which is one of the well known indicating levers of the box operating mechanism, which mechanism consists of a double cam 20 mounted upon the loom's shaft $s^4$, one part of which cam operates the lever 21, the other the lifter 22 for effecting the upward movement of the levers $p\,p'$, the return movement of the said levers being effected by gravity. The vertical catches 23 and 24 engage with the lever 21 as and when operated by the levers $p\,p'$, these catches 23 and 24, in connection with the lever 21 causing the shuttle-boxes D to revolve in one direction or the other through the medium of the levers 25 and 26, to which they are respectively attached, the draw catches 27 and 28 attached to these levers 25 and 26 and the peg-wheels 29 fixed on the shaft of the shuttle-boxes D) to place the catch 23 into connection with the lever 21 to effect a movement in the shuttle-boxes in the direction of the arrow 30. Now provided a short peg was in position for receiving the pin $f^2$ on the part $f'$, these would descend lower than if arrested by the said long peg, and through the above described means, would draw the notched pieces $n$ and $n'$ into such a position (which is shown by all the drawings) that the notch $n^3$ of piece $n'$ would allow the pin $o^3$ on the rod $o^3$ to descend therein and allow the other lever $p'$ to place the catch 24, into connection with the lever 21 and so effect a movement of the shuttle-boxes D in the opposite direction to that indicated by the arrow 30. When, however, there is no peg to receive the pin $f^2$ and the part $f'$, they will descend to their lowest position so that the notched pieces $n$ and $n'$ will be moved with their notches out of the path of motion and their full parts into position for catching or arresting both of the pins $o'$ and $o^2$ in order that the rods $o$ and $o^3$ may be held from putting either of the levers $p$ and $p'$ into position by which means the shuttle-boxes D will remain stationary.

The movements of the notched pieces $n$ and $n'$ in the contrary direction to that in which they are moved by the rod $m^2$ are effected by the spring 31, having one end connected with the lever $m$ and its other end with the frame, which spring always tends to move them into one normal position, and by the slot in the rod $m^2$ such movement is permitted to be considerably less than that of said rod $m^2$.

When cards $d'$ (see Fig. 13) are to be employed in place of lags having pegs of different lengths, the part $f'$ has two pins $f^3$ and $f^4$, the longer pin $f^3$ to fall upon the blank part of the card when the part $f'$ has to be arrested in its highest position, and the shorter pin $f^4$ to do likewise (at which time an opening is made in said card $d'$ to receive the longer pin) when said part $f'$ has to be arrested in its middle position while by two holes being made in the card so that both of the pins $f^3$ and $f^4$ may pass through, then the part $f'$ may descend to its lowest position.

These cards $d'$ are well known equivalents for the lags $d$ and their pegs in the formation of a pattern surface.

In order that the weaver or operative may be enabled to manually move the bracket $f$ step by step backward or in the direction opposite to the arrow 12 (Fig. 4) for the purpose of effecting its necessary readjustment on the stoppage of the loom under certain conditions, as the breakage of the weft, &c., a catch pin 32 having a slot for the reception of the ratchet $x$ is mounted to slide freely through the hub 33 formed on or attached to the bracket $f$, its normal elevated position being secured by the spring 34 in which position its slot allows the ratchet $x$ to be freely operated by the part $z'$. However, when the grid $k$ is raised clear of the finger $f^5$ the operative may by forcing the catch pin 32 downward raise the ratchet $x$ out of gear with the rack $u$ but the relative positions of the catch pin 32, rack $u$ and ratchet $x$ are at this time so arranged that the said catch pin 32 is sufficiently depressed to be in the path of motion of the teeth on the rack $u$ prior to the ratchet $x$ being thereby raised out of gear with said rack $u$ by which means at each downward movement of the catch pin 32, when the grid $k$ is in the position stated, the bracket $f$ is moved one step backward by means of its retracting spring in the box 3.

We are aware that it has been proposed to use an intermittently-moving pattern surface in which the succeeding indicating devices are arranged circumferentially around the pattern surface, and in which the part coacting with such indicating devices is moved from one circumferential row to the next after one complete revolution of the pattern surface; but we do not claim this, as we consider our invention essentially different from and superior to such an arrangement.

Having thus fully described our said invention, what we consider as new, and desire to secure by Letters Patent, is—

1. In a pattern mechanism, the combination of an intermittently-moved pattern surface, having its indicating devices arranged in successive operating order in horizontal rows on the same, a sliding bracket $f$, means constructed to automatically move the same successively past each indicating device in each horizontal row of the same, a hinged part $f'$ moved with said sliding bracket, and means constructed to bring said part $f'$ successively into operative connection with each of the indicating devices in each horizontal row of the same, and then into operative connection with the successive indicating devices in the next horizontal row, substantially as described.

2. In pattern surface mechanism, the combination of the frame, bars $e$, $e'$, a bracket $f$ sliding thereon having projection $f^5$, a rack $u$ mounted in the frame, a pawl $x$ carried by the bracket and engaging the teeth of the rack, means for actuating the same, whereby said bracket is given a step-by-step motion in one direction, a spring 16 for giving the bracket a motion in the opposite direction, a hinged part $f'$ carried by and moved with the sliding bracket $f$, the oscillating grid $k$ engaging the projection $f^5$ for retaining the said sliding bracket $f$ in position, as well as for imparting oscillatory motion to the said hinged part $f'$, and means for imparting the said oscillatory movement to said grid $k$, substantially as herein specified.

3. In a pattern mechanism, the combination with a rotating pattern cylinder, the acting surfaces of which are arranged in longitudinal rows, of a sliding bracket $f$, guide bars therefor adjacent to the pattern cylinder, a retracting spring 16 to which the said bracket is attached, a pawl carried by the bracket, a reciprocating toothed rack engaging the said pawl, means for moving the rack, an oscillating grid, a projection $f^5$ on the said bracket and engaged by the said grid to retain the bracket in the position to which moved, means to oscillate the grid to permit movement of the bracket, a hinged part $f'$ carried by and moved with the bracket and connected with the grid, the free end of the said hinged part being acted upon by the pattern surface which determines the extent of oscillation of the grid, a pin $y$ and a pivoted lever $z$ mounted upon the hinged part $f'$, one end of the lever resting upon the said pin, a projection $y'$ adjacent to one end of the pattern cylinder in the path of said pin $y$, a cam slide $z'$ acted upon by the other end of said lever $z$, so that when the pin $y$ contacts with the projection $y'$ the cam slide $z'$ is moved to disengage the pawl from the rack to permit the spring 16 to retract the carriage, means to rotate the pattern cylinder to present another row of its surface, means for disengaging the cam slide from the pawl, and connections operated from the grid to determine the order of the shuttle boxes, substantially as described.

4. In a pattern mechanism, the combination of a pattern sliding bracket $f$, a hinged part $f'$ carried by and moving with said bracket, a grid rail $k$ connected to said hinged part and imparting oscillatory motion to the same and adapted to be arrested in its descent by said hinged part contacting with the pattern a lever $h$ attached to said grid rail, a shaft $m'$, notched pieces mounted thereon, a lever $m$ on said shaft, a spring 31 operating to depress said lever $m$ and a slotted rod connecting said levers $h$ and $m$, vertically-movable rods $o$ and $o^3$ carrying pins to operate in connection with the said notched pieces, means for operating said rods $o$ and $o^3$ the indicating levers, and the shuttle box operating mechanism, substantially as described.

5. In a pattern mechanism, the combination of a sliding bracket $f$, a supporting guide for the same, a hinged part $f'$ carried by and moved with said bracket $f$, rack $u$ and means for operating the same, a pawl $x$ carried by the bracket and engaging with the rack for operating said bracket $f$, a grid rail $k$ for operating said hinged part $f'$, a pin lever $z$ and a sliding cam piece $z'$ for disengaging said pawl $x$ and rack $u$, a hinged lever bar 5 operated in one direction by said cam slide $z'$, a spring $t$ operating said cam slide in the opposite direction, means for retracting the sliding bracket a pattern cylinder, a toothed wheel mounted on the shaft of said cylinder, a reciprocating catch 7, for operating said wheel, and a disengaging slide piece 6 for putting the operating catch 7 out of gear or allowing it to fall into gear with the wheel 8, substantially as specified.

6. In a pattern mechanism, the combination of a sliding bracket $f$, a supporting guide for the same, a hinged part $f'$ carried by and moved with said bracket $f$, rack $u$ and means for operating the same, pawl $x$ carried by said bracket and engaging rack $u$, spring mechanism for operating said bracket $f$ in one direction, a grid rail $k$ for operating said hinged part $f'$, pin lever $z$, sliding cam piece $z'$ engaging with one end of the pin lever, and a knock-off piece 9 arranged to disengage the pawl $x$ from the sliding cam piece $z'$, substantially as set forth and described.

7. In a pattern surface mechanism, the combination of a sliding bracket $f$ having hub 33, rack $u$ and means for operating the same, the pawl $x$ carried by the bracket and engaging the rack for moving said bracket $f$ step by step in one direction, a retracting spring 16 for accomplishing the return movement of said bracket $f$, the vertically-moving catch-pin 32 for raising the ratchet $x$, and arranged to slide within and be supported by the hub 33, and the spring 34 acting to raise said pin, substantially as set forth.

JAMES HILL.
EBER SMITH.

Witnesses:
SAMUEL HEY,
JOHN WHITEHEAD.